Nov. 22, 1938.  A. C. ELLIS  2,137,447
EDUCATIONAL DEVICE
Filed June 5, 1937
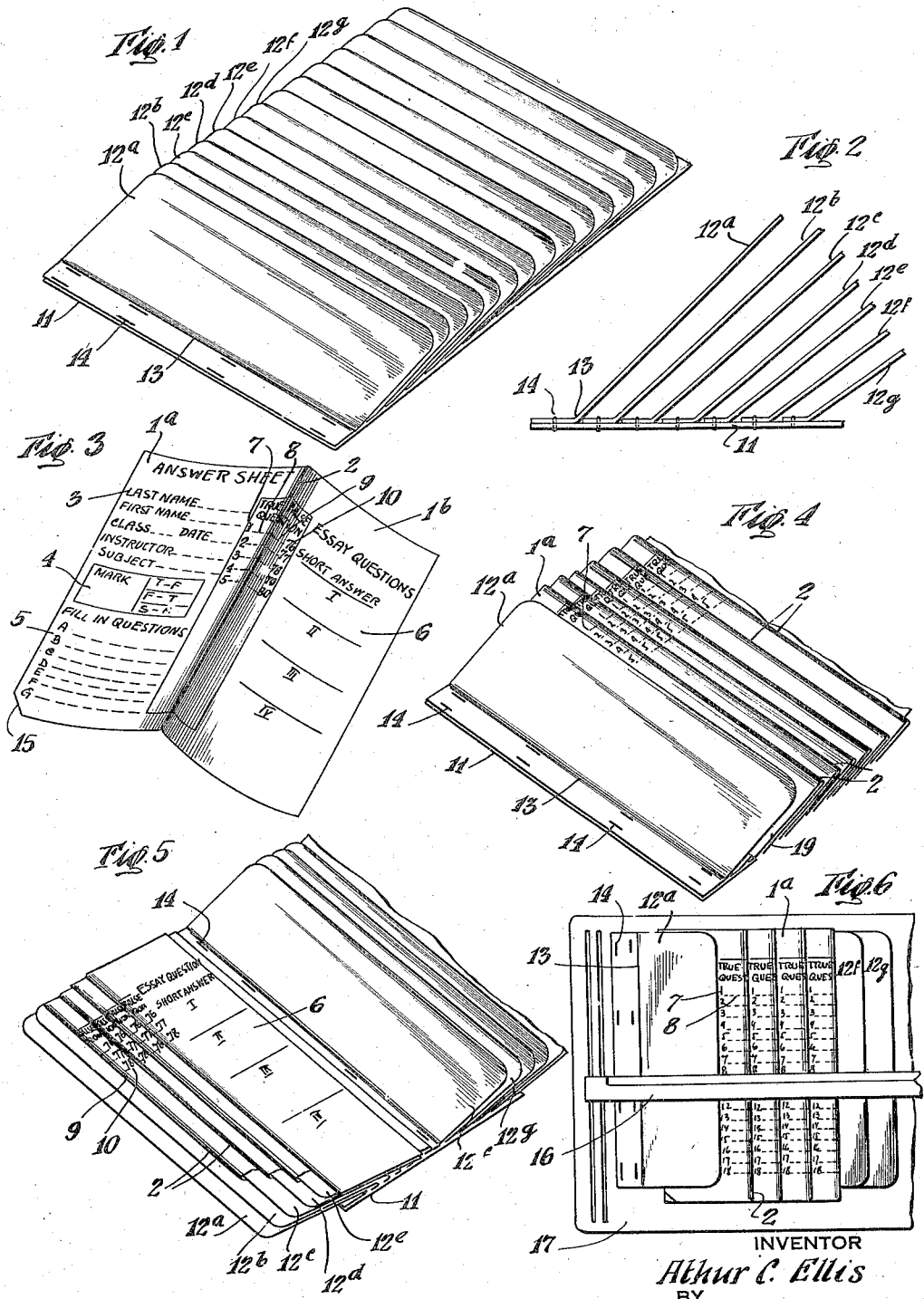
INVENTOR
Arthur C. Ellis
BY
Leland L. Chapman
ATTORNEY Patented Nov. 22, 1938

2,137,447

UNITED STATES PATENT OFFICE 2,137,447

EDUCATIONAL DEVICE

Arthur C. Ellis, New York, N. Y.

Application June 5, 1937, Serial No. 146,535

2 Claims. (Cl. 35—48)

My invention relates to an educational device. More particularly it relates to a device for facilitating the correction of answers in examination papers, as well as to the examination papers which form a part of the device.

Many questions given in examinations are of such a nature that they can be answered "yes" or "no". The student may therefore answer the question simply by writing either of the words "yes" or "no". Other examinations include statements which are a correct or inaccurate statement of fact. These statements can be designated in the examination paper as "true" or "false".

Heretofore in correcting such papers, it has been customary to consider the examination paper of one particular student and to determine the correctness of all the answers in that student's paper before considering the answers in the papers of other students. Numerous proposals have heretofore been made to facilitate the correction of examination questions in this manner, such as stencils, or other guides to assist in determining the correctness of the answers in any particular paper.

In many instances, it is desirable to correct the answer to a particular question in the papers of all of the students before correcting other answers.

It is an object of my invention, therefore to provide examination papers and means which will facilitate the correction of all the answers to a particular question, before correcting the answers to another question.

It is also an object of my invention to provide examination papers and means which will permit the correction, in any particular order, of all of the answers to each of several questions which are not listed consecutively in the examination paper.

In many instances it is advantageous to be able to compare the answers to two different questions. As an additional object of my invention, I provide means for permitting the inspection of all of the answers to each of several questions, so that all of the answers to one question may be compared with all of the answers to another question.

It is also an object of my invention to provide examination papers not only containing provision for "true-false" and "yes-no" questions, so spaced as to be corrected in accordance with my invention, but also to contain provisions for answers to other questions of different types.

My invention will be better understood in connection with the drawing forming a part of the specification, and in which:

Figure 1 is a perspective view of the locating frame on which the papers are placed;

Figure 2 is an end elevation of the locating frame shown in Figure 1 but with the paper holders in raised position;

Figure 3 is a perspective view of a partially folded examination paper with the questions arranged thereon to facilitate their correction in accordance with the invention;

Figure 4 is a perspective view of the locating frame with the examination questions placed on the paper holders in position for consideration or correction;

Figure 5 is a view similar to Figure 4 but with a portion of the paper holders in reversed position to facilitate correction of other of the answers; and Figure 6 is a plan view showing guiding means for comparing all the answers to a given question.

Referring to the drawing more particularly as showing an illustrative embodiment of my invention, Figure 3 shows an examination paper made in accordance with the invention. The examination paper is preferably made out of ordinary writing paper, but may be of other suitable materials, and is folded in the center lengthwise at 2 forming a left-hand page 1a and a right-hand page 1b. On the left-hand page is a space for identification of the student, a space 4 for denoting the grade or mark obtained, and spaces 5 for written-in questions, ordinarily known as "fill-in" questions. On the right-hand page a space 6 for essay questions or short answer questions may be provided. The reverse side of both pages may also be used for questions. It will be understood that the arrangement and the type of these examination questions may be varied over wide limits, depending upon the nature of the examination and the type of question preferred by the instructor.

The "yes-no" or "true-false" questions, may not, however, be indiscriminately positioned on the page and in the illustrated embodiment are placed adjacent the center fold. These are preferably divided in two columns immediately to the left and right of the fold. The questions are numbered in a vertical column 7 on the left-hand side, and immediately to the right of which is a column of blank spaces 8 in which the answers may be indicated. On the right-hand page of the folded sheet, blank spaces 9 for the answers are adjacent the fold, and the numbers 10 identifying the questions are in a column immediately to the right thereof.

The student in answering the "true-false" or

"yes-no" questions, indicates the answer in the blank space contained in the columns 8 and 9, immediately opposite the identifying question numbers contained in the corresponding column 7 or 10.

In order to facilitate correcting the answers to the questions, I provide a locating frame, generally illustrated in Figures 1 and 2, and comprising a base 11 which may be made out of cardboard, sheet metal, or other similar materials. To the base 11 paper holders 12a, 12b, 12c . . . 12g, etc., are secured. The paper holders are preferably made out of cardboard or other sufficiently stiff sheet material, and are each provided with a hinge 13, made by scoring the cardboard. The paper holders are secured to the base 11 by any suitable means such as staples 14. Each of the paper holders 12a, 12b, etc., is of substantially the same width and is secured on the frame in overlapping relation so that the exposed right-hand margin of each holder corresponds in width substantially to the width of the column containing the "true-false" or "yes-no" questions adjacent the fold in the examination paper. Also, preferably, the width of the paper holders 12a, 12b, etc., from their free side to the hinge, is at least as great or slightly greater than the width of the folded examination sheet.

In their normal position the paper holders lie over each other as shown in Figure 1, but by means of the hinge they may be folded back 180° and lie in overlapping relation with the left-hand margins of the opposite side exposed.

In correcting the papers, a folded examination paper is placed on each of the paper holders so that the folded examination paper covers each side of the paper holder, and has its fold adjacent the free side of the holder. If desired, the examination paper may be provided with a cut corner 15 to facilitate the placing of the examination paper upon the holder.

The number of paper holders 12 which are secured to the base 11 may be any number, but one holder must be provided for each paper to be graded and therefore the number of holders should not be smaller than the total number of examination papers to be graded at one time. It is, however, unnecessary that examination papers be placed on all the holders in order that they may be corrected in accordance with my invention.

After all the folded examination papers have been placed upon holders they will appear as shown in Figure 4, with the column of "true-false" or "yes-no" answers on the left-hand side of the page 1a appearing in columns side by side in adjacent relation. It will, therefore be possible for the instructor to grade all the answers to any particular question by viewing the answers to that question which are exposed in a horizontal line.

After all the questions contained in the column on the left-hand side of the sheet have been corrected, the holders, with the examination paper still overlying the same, may be reversed in position by folding them on their hinges 13. A portion of the holders in reversed position with papers thereon is illustrated in Figure 5. When the holders are reversed in this position, the answers to the "true-false" or "yes-no" questions on the right-hand page of the folded sheet are exposed in adjacent columns in a similar manner and it is possible, similarly to correct all the answers on the right-hand page.

In order to facilitate the aligning and also the removal of the papers from the holders, the latter may be provided with rounded corners 18 at the bottom.

If there is not sufficient space for the questions, columns of questions may be placed on the other side of the sheet adjacent the fold, and after correcting the answers on one side of the sheet, the sheets may be folded over and replaced on the paper holders for correction of the answers on the other side.

While I have shown the examination papers as being approximately the same length as the holders 12, it is obvious that the papers may be shorter or longer. It is not necessary that the papers extend the entire length of the holders and, similarly, if they are longer, they may extend above or below the holders, as shown at 19 in Figure 4.

It will also be apparent that the number of questions placed in the "true-false", "yes-no" columns may vary as well as the lentgh of the examination paper. If desired, the "true-false" questions may be contained only on the right or left-hand side of the sheet, preferably the left-hand side, and the other side devoted entirely to questions of another type. In this event it will be unnecessary to reverse the position of the holders.

If desired, suitable guide means 16 may be arranged to slide up and down on a board 17 to facilitate the consideration of all the answers to a single question on a horizontal line.

My invention has other advantages not heretofore mentioned. The ability to consider all the answers to a single question at one time is of advantage in determining the correctness with which the question has been propounded. For example, if a large proportion of the class has given the wrong answer to a particular question, it may be that the question was stated ambiguously and not understood, and, if this is found to be a fact, suitable consideration may be given to this point in determining the students' marks. In methods of correcting examination papers heretofore used, in which each paper was considered separately, it has been impossible, or at least extremely difficult, to determine the percentage of correct answers to a single quetsion. In my invention, it is extremely simple to determine not only the percentage of correct answers in a given student's paper, but the percentage of correct answers to any particular question. In this way it is possible to determine what portions of the instruction need reviewing or further explanation in subsequent lectures.

Also, in some examinations, the questions are interrelated. For example, if the answer to Question 2 is "yes", then the answer to Question 8 must be "yes" if the student is familiar with the subject matter. If the answer to Question 8 is given as "no", this is an indication that the student has guessed at the answers to one or both of the questions. By arranging the papers according to my invention, it is possible to determine the extent to which guessing has taken place in an examination and, therefore, to determine the extent to which the class as a whole understands the subject matter in which the examination has been conducted.

While I have disclosed my invention primarily as applicable to the correction and comparison of answers to examination questions, it will be obvious that it may be used for other corrections and comparisons. For example, in psychological or criminal tests, the characteristics of an individual may be recorded in a vertical column adjacent the fold of a paper and the papers containing the information for a number of individuals may be placed upon the holders. By this means, it is possible to determine the extent of likeness of any given characteristic of any group of individuals and to compare the relationship of such characteristics.

It may also be used in numerous business enterprises for tabulating and comparing data such as information as to sales, production facilities, etc.

It will be obvious that many variations and modifications can be made, which differ from the particular illustrative embodiment herein described, without departing from the spirit of my invention, and I intend all such variations and modifications to be within the scope of my invention as defined in the following claims.

I claim:

1. In combination, a supporting base, a plurality of holders secured at one edge to said base in overlapping relation, each holder being provided with a hinge permitting the holders to overlap in the reverse direction, a plurality of pieces of folded sheet material overlying a plurality of said holders with the fold adjacent a free edge of said holder, a plurality of indicia on said sheet material identically spaced on each piece and adjacent the folded edge of said folded sheet, said indicia occupying two vertical columns on each side of said fold and being of substantially the same width as the overlap in the holders, whereby the columns of indicia on one side of the fold may be exposed in adjacent relation when the holders overlap in one direction, and the columns of indicia on the other side of the fold may be similarly exposed when said holders with the sheet materials are overlapping in the reverse direction to permit inspection of said indicia.

2. In combination, a supporting base, a plurality of overlapping holders secured at one edge to said base, a plurality of pieces of folded sheet material overlying a plurality of said holders with the fold adjacent a free edge of said holder, a plurality of indicia on said sheet material identically spaced on each piece with reference to each other, said indicia occupying a vertical column adjacent the folded edge of said folded sheet and being of substantially the same width as the overlap in the holders, whereby said columns of indicia are exposed in adjacent relation in the overlapping area of said holders to permit simultaneous inspection of said indicia on all said pieces of sheet material.

ARTHUR C. ELLIS.